(12) United States Patent
McLaughlin et al.

(10) Patent No.: US 11,440,522 B2
(45) Date of Patent: Sep. 13, 2022

(54) COMBINED DIRT COLLECTOR AND CUTOUT COCK HAVING CONTROLLED VENTING

(71) Applicant: NEW YORK AIR BRAKE, LLC, Watertown, NY (US)

(72) Inventors: Bryan M. McLaughlin, Watertown, NY (US); Lawrence E. Vaughn, Watertown, NY (US); Derick Call, Evans Mills, NY (US); Christopher J. Ferguson, Watertown, NY (US); Joshua D. Woodruff, Calcium, NY (US); Danial Rowland, Adams Center, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 16/052,959

(22) Filed: Aug. 2, 2018

(65) Prior Publication Data

US 2019/0118791 A1 Apr. 25, 2019

Related U.S. Application Data

(60) Provisional application No. 62/576,869, filed on Oct. 25, 2017.

(51) Int. Cl.
*B60T 17/04* (2006.01)
*B60T 15/52* (2006.01)
(Continued)

(52) U.S. Cl.
CPC .............. *B60T 17/04* (2013.01); *B60T 15/52* (2013.01); *B60T 17/002* (2013.01);
(Continued)

(58) Field of Classification Search
CPC ...... F16K 5/0605; F16K 24/02; B60T 17/043; B60T 17/04; Y10T 137/7256
See application file for complete search history.

(56) References Cited

U.S. PATENT DOCUMENTS 952,121 A * 3/1910 Koehler ................ F16K 31/602
251/99
952,743 A * 3/1910 Jenkins ................ F16K 31/602
251/99
(Continued)

FOREIGN PATENT DOCUMENTS

FR 2522385 A1 * 9/1983 ........... F16K 5/0605

OTHER PUBLICATIONS

International Search Report and Written Opinion Form PCT/ISA/220 and PCT/ISA/237, International Application No. PCT/US2018/044968, pp. 1-11, International Filing Date Aug. 2, 2018, dated Nov. 20, 2018.

*Primary Examiner* — David Colon-Morales
(74) *Attorney, Agent, or Firm* — Bond Schoeneck and King PLLC; George McGuire

(57) ABSTRACT

A combined dirt collector and cutout cock (CDC & COC) device for a rail car control to prevent unintentional re-pressurization of the control valve and rail car braking system. The device has an inlet configured for interconnection to an air supply, an outlet configured for interconnection to a control valve of a rail car, a valve moveable between a first position where an inlet is connected to an outlet and a second position where the inlet is isolated from the outlet, and a control valve vent positioned downstream of the valve and configured to open in response to the valve being moved into the second position. The valve may include a ball having a first passageway for selectively connecting and disconnecting the inlet from the outlet and a second pas- (Continued)

sageway formed therethrough that is positioned to interconnect the outlet with the vent when the valve is in the second position.

15 Claims, 17 Drawing Sheets

(51) Int. Cl.
B60T 17/00 (2006.01)
B61H 13/34 (2006.01)
F16K 24/02 (2006.01)
F16K 5/06 (2006.01)

(52) U.S. Cl.
CPC ............ B60T 17/043 (2013.01); B61H 13/34 (2013.01); F16K 5/0605 (2013.01); F16K 24/02 (2013.01); *Y10T 137/7256* (2015.04)

(56) References Cited

U.S. PATENT DOCUMENTS

| | | | | |
|---|---|---|---|---|
| 1,035,490 A * | 8/1912 | Stott | F16K 31/602 | 251/99 |
| 1,177,968 A * | 4/1916 | Smith | F16K 5/0605 | 137/625.22 |
| 1,351,391 A * | 8/1920 | McGahey | B60T 17/043 | 251/98 |
| 1,380,307 A * | 5/1921 | William | B60T 17/043 | 251/107 |
| 1,434,665 A * | 11/1922 | Rodriguez | B60T 17/043 | 251/98 |
| 1,459,654 A * | 6/1923 | Clauss | B60T 17/043 | 303/86 |
| 1,655,889 A * | 1/1928 | Beach | B61D 27/0036 | 137/625.22 |
| 1,787,775 A * | 1/1931 | Samuelg | F16K 35/02 | 251/105 |
| 1,850,621 A * | 3/1932 | Farmer | B60T 15/048 | 303/51 |
| 1,871,214 A | 8/1932 | Haynes | | |
| 1,967,309 A * | 7/1934 | Hume | B60T 17/043 | 251/110 |
| 2,147,287 A * | 2/1939 | Farmer | B60T 17/043 | 251/109 |
| 2,553,349 A * | 5/1951 | Annicq | F16K 5/162 | 251/161 |
| 2,678,186 A * | 5/1954 | Blackford | F16K 35/025 | 251/105 |
| 2,877,979 A * | 3/1959 | Snyder | F16K 5/0464 | 251/174 |
| 3,184,212 A * | 5/1965 | Billeter | F16K 5/0673 | 251/105 |
| 3,186,436 A * | 6/1965 | Modrin | B60T 15/048 | 137/625.22 |
| 3,288,498 A * | 11/1966 | Billeter | F16K 5/08 | 285/334.1 |
| 3,301,271 A * | 1/1967 | Burke | B60T 17/043 | 137/315.25 |
| 3,464,449 A * | 9/1969 | Morton | F16K 24/02 | 137/625.24 |
| 3,591,137 A * | 7/1971 | Billeter | F16K 41/046 | 251/205 |
| 3,647,178 A * | 3/1972 | Adams | F16K 5/205 | 251/148 |
| 3,674,052 A * | 7/1972 | Hartman | F16K 5/0605 | 137/625.21 |
| 3,714,968 A * | 2/1973 | Billeter | B60T 17/043 | 137/596.2 |
| 3,770,016 A * | 11/1973 | Johnstone | F16K 5/0605 | 137/625.22 |
| 3,858,843 A * | 1/1975 | Hartmann | F16K 35/00 | 251/99 |
| 4,027,698 A * | 6/1977 | Weinhold | F16K 11/0873 | 137/625.22 |
| 4,089,345 A * | 5/1978 | Eberhardt | F16K 5/0605 | 137/315.19 |
| 4,099,543 A * | 7/1978 | Mong | F16K 5/0605 | 137/625.22 |
| 4,125,128 A | 11/1978 | Elward et al. | | |
| 4,428,622 A * | 1/1984 | Beacon | B60T 17/04 | 137/625.47 |
| 4,456,219 A * | 6/1984 | Scott | F16K 31/602 | 16/438 |
| 4,548,237 A * | 10/1985 | Bogenschutz | F16K 5/0605 | 137/625.22 |
| 4,708,158 A * | 11/1987 | Akamatsu | F16K 27/067 | 137/315.19 |
| 5,183,073 A * | 2/1993 | Roberts | F16K 5/0647 | 137/385 |
| 5,188,335 A * | 2/1993 | Pettinaroli | F16K 35/06 | 137/315.18 |
| 5,360,036 A * | 11/1994 | Kieper | F16K 5/0605 | 137/315.18 |
| 5,632,294 A * | 5/1997 | Benton | F16K 5/0605 | 137/1 |
| 5,785,074 A * | 7/1998 | Kieper | F16K 5/0605 | 137/312 |
| 5,887,850 A * | 3/1999 | Ruffalo | F16K 35/027 | 251/95 |
| 6,095,495 A | 8/2000 | Poteralski et al. | | |
| 6,298,878 B1 * | 10/2001 | Asano | F16K 5/0605 | 137/625.21 |
| 7,089,960 B2 * | 8/2006 | Maruta | F16K 5/0605 | 137/625.22 |
| 7,455,372 B2 * | 11/2008 | Wang | B60T 17/043 | 251/314 |
| 2015/0285383 A1* | 10/2015 | Stumbo | F16K 24/02 | 137/1 |

* cited by examiner

COMBINED DIRT COLLECTOR AND CUTOUT COCK HAVING CONTROLLED VENTING

CROSS-REFERENCE TO RELATED APPLICATIONS

The present application claims priority to U.S. Provisional Application No. 62/576,869 filed on Oct. 25, 2017.

BACKGROUND OF THE INVENTION

1. Field of the Invention

The present invention relates to cutout cocks for railcar control valves and, more particularly, to a combined dirt collector and cutout cock that can selectively vent the control valve to prevent unintentional pressurization while allowing for intentional pressurization during testing operations.

2. Description of the Related Art

A combined dirt collector and cutout cock (CDC & COC) device is typically installed in the branch pipe between the brake pipe and the brake control valve on an Association of American Railroads (AAR) complaint rail car. This device provides the dual function of capturing air borne dirt and debris (DC) from the brake pipe before it can contaminate the brake control valve and provides a dual position valve (COC) which can be used to isolate the control valve from the brake pipe in the event of a control valve failure.

If a railcar in an active train is found to have a defective control valve, the carman will first isolate the control valve by closing the CDC & COC device and then vent the pressurized air in that car using a release valve on the control valve. This action releases the brakes of the rail car and vents the on-car reservoirs that supply the brake cylinder of the rail car so that the train can proceed with the rail car braking system taken off-line until the next train inspection location. If CDC & COC device leaks when it is in the closed position, however, the control valve can re-pressurize such that the reservoirs and the brake cylinder are recharged, thereby causing a stuck brake that can result in overheated wheels.

Today, for example, AAR compliant trains are inspected every 1000 miles. Recently, some trains have obtained approval to operate 1500 miles between inspections, and there is desire in the field to operate up to 5000 miles between inspections. As trains are allowed to run greater distances between inspections, the possibility of a leaking CDC & COC device causing a stuck brake only increases. As it is not possible to include a vent in a CDC & COC device that remains open when the device is closed because it will interfere with the re-pressurization of the control valve that must occur during mandatory testing procedures, there is a need in the art for a CDC & COC device that will not unintentionally allow re-pressurization but will also allow testing procedures to take place.

BRIEF SUMMARY OF THE INVENTION

The present invention is a combined dirt collector and cutout cock (CDC & COC) device for a rail car control valve that prevents unintentional re-pressurization of the control valve and rail car braking system while allowing for routine testing of the associated control valve. The combined dirt collector and cutout cock device has an inlet configured for interconnection to an air supply, an outlet configured for interconnection to a control valve of a rail car, a valve moveable between a first position where an inlet is connected to an outlet and a second position where the inlet is isolated from the outlet; and a control valve vent positioned upstream of the outlet and configured to be open when the valve is in the second position. The valve includes a ball having a first passageway formed therethrough for selectively connecting and disconnecting the inlet from the outlet as the ball is rotated within the valve from the first position to the second position. The ball includes a second passageway formed therethrough that is positioned to interconnect the outlet with the vent when the valve is in the second position. A handle may be interconnected to the ball via a drive stem that extends from a free end to end coupled to the ball so that movement of the handle rotates the ball within in the valve. The second passageway may extend through the drive stem and the vent is positioned at the free end of the drive stem. A shut-off valve that can selectively open and close the vent may be included. The shut-off valve may be a push/pull valve actuator associated with the drive stem. Piping may be coupled to the vent and connected to a shut-off valve. The shut-off valve may be positioned proximately to a 4-port interface. The shut-off valve may be incorporated into the dust cover of a 4-port test interface. The shut-off valve may also be incorporated into a 4-port test interface. A shut-off valve may be associated with the vent, with the valve of the device and the shut-off valve independently moveable via first and second handles. A ratchet having a handle may be coupled to the valve for movement of the valve between the first and second positions. The ratchet may be configured to move the valve into at least a third position where the valve is closed and the vent is closed. The valve may comprise a ball positioned between a pair of opposing seals in a ball housing and the vent comprises an opening formed through the ball housing that is in alignment with a gap between the pair of opposing seals.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
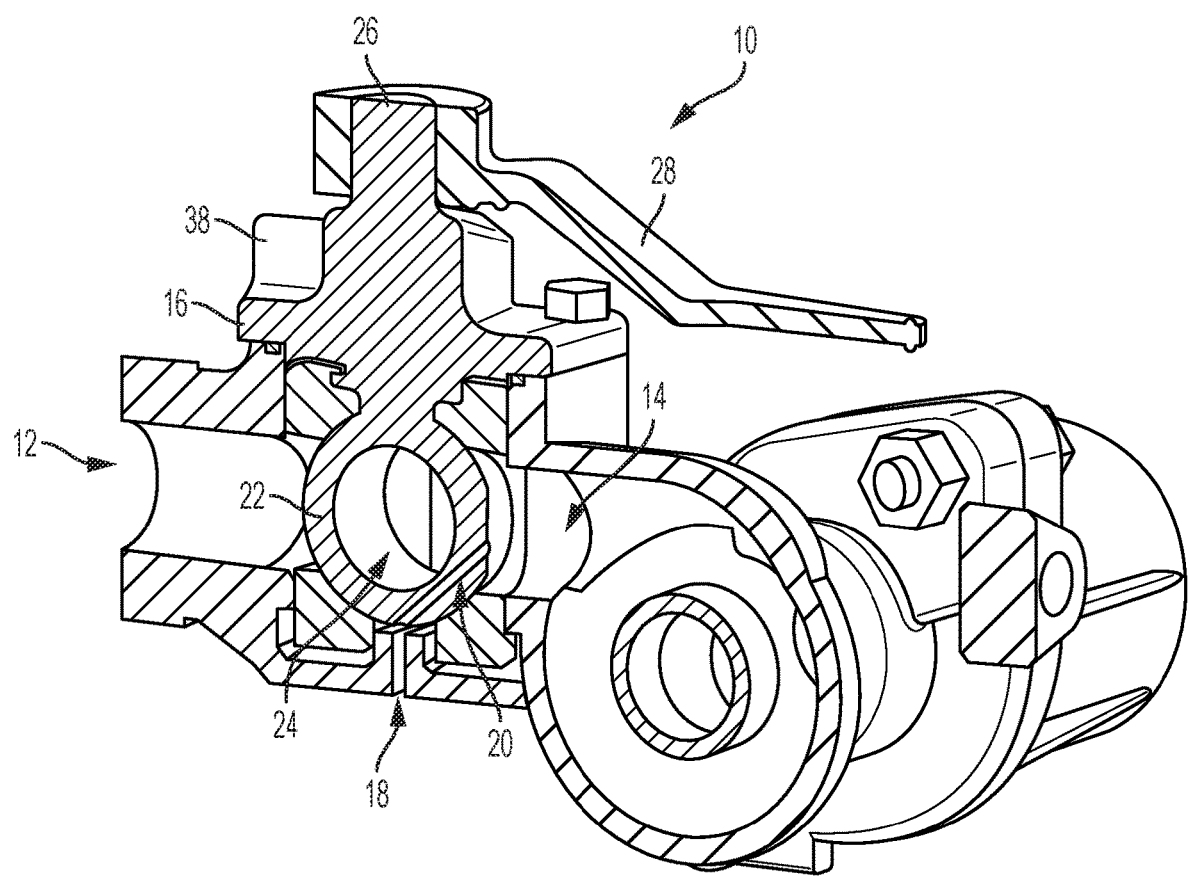
FIG. 1 is a schematic of an embodiment of a combined dirt collector and cutout cock according to the present invention.

Referring to the figures, wherein like numeral refer to like parts throughout, there is seen in FIG. 1 a first embodiment of a combined dirt collector and cutout cock (CDC & COC) device 10 that prevents unintentional re-pressurization of a control valve and rail car braking system while allowing for routine testing of the associated control valve. Device 10 includes an inlet 12 that is connected to the air supply of the train and an outlet 14 that leads to the control valve of a rail car. A valve 16 positioned between inlet 12 and outlet 14 may be opened or closed to connect or disconnect a control valve attached to outlet 14 from the train air supply that is coupled to inlet 12. Device 10 further includes a control valve vent 18 coupled to outlet 14 via a vent passageway 20, shown extending through a side portion of ball 22 of valve 16 separately from the main passageway 24 that extends entirely through ball 22 from one side to the other, and is thus downstream of the disconnection point between inlet 12 and outlet 14 and upstream of any control valve coupled to outlet 14. Ball 22 is moveable via a stem 26 that extends upwardly from valve 16 and is interconnected to a user handle 28. In addition to the normal position where valve 16 is open so that the control valve may be pressurized from the train air supply coupled to inlet 12, device 10 includes a first cut-out position that allows for depressurizing of the control valve and the defective braking system of a rail car and a second cut-out position for performing testing operations of the control valve. In the first cut-out position, control valve vent 18 is placed into open communication with outlet 14 via passageway 20 and thus maintains the connection to exhaust for the control valve positioned downstream of device 10. As a result, the control valve and any defective brakes on the railcar cannot be pressurized and will remain depressurized even if device 10 leaks so that the air supply at inlet 12 provides air to outlet 14. In the second cut-out position, passageway 20 is repositioned by movement of ball 22 to reconnect passageway 20 to inlet 12, while inlet 12 and outlet 14 remain isolated by ball 22 of valve 16 so that conventional testing procedures may take place, with the control valve and braking system pressurized by external testing equipment without loss of pressure through device 10.

Figure 2:
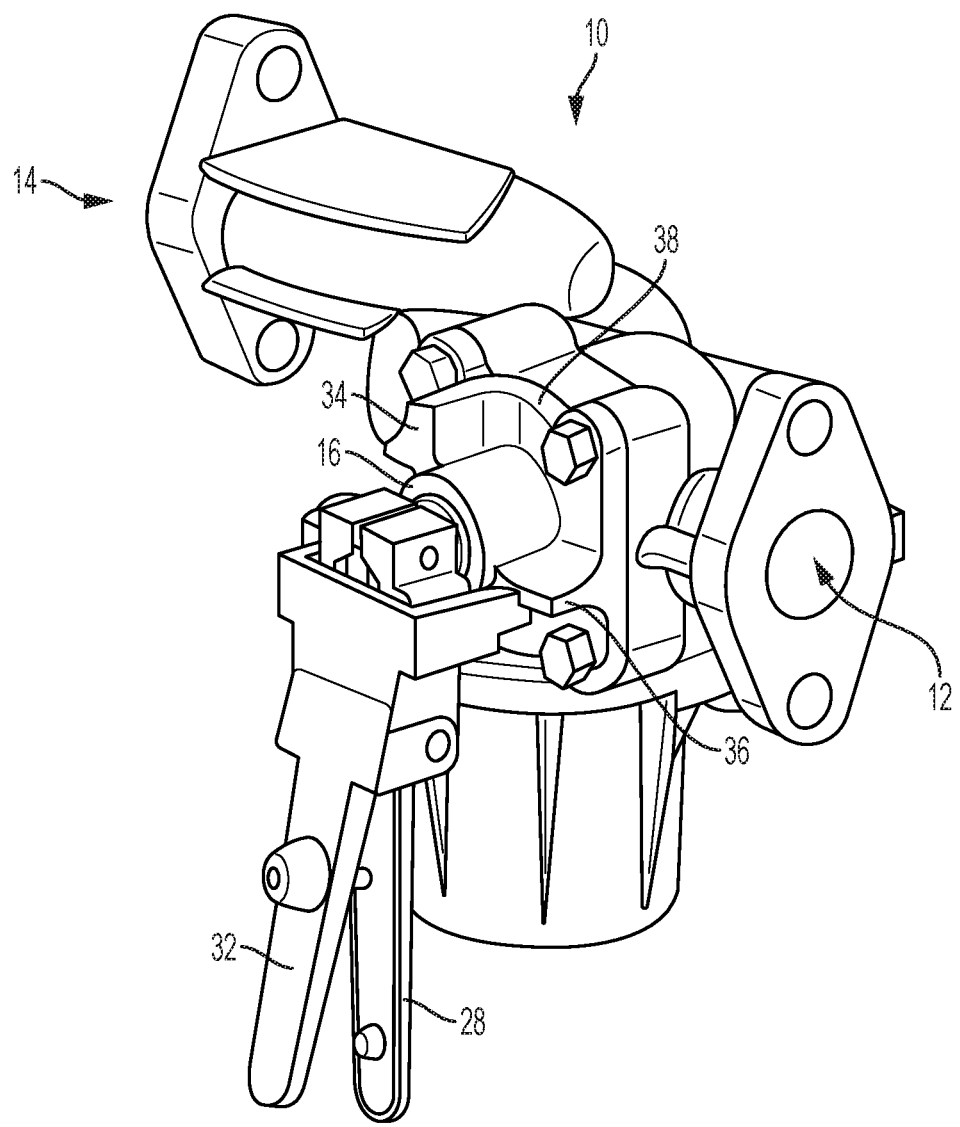
FIG. 2 is a schematic of a handle for an embodiment of a combined dirt collector and cutout cock according to the present invention.
Figure 3:
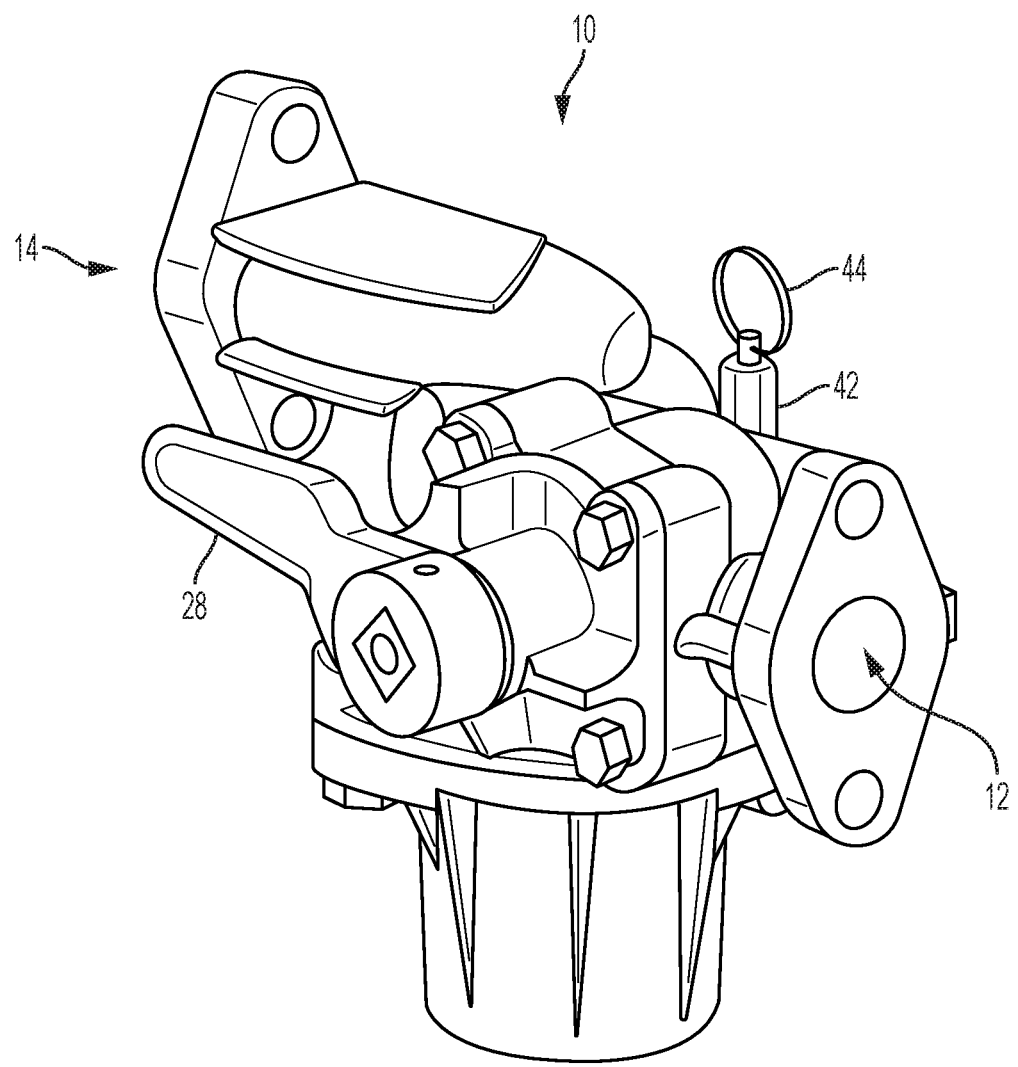
FIG. 3 is a schematic of another handle for an embodiment of a combined dirt collector and cutout cock according to the present invention.

Referring to FIG. 2, the second cut-out position may be protected by a latch, pin, or other interlock, to prevent unintentional use when the intent is to select the first position and simply cut-out a defecting braking system. For example, device 10 is illustrated as having a locking handle 32 positioned over handle 28 and corresponding detents 34 and 36 on the valve cover 38 of device 10. Device 10 is open when the handle position is down as shown in FIG. 2, and thus allows the pressurized air supply of the train to pressurize a control valve positioned downstream of device 10. To close device 10, and thus cut-out the control valve, handle 28 may be rotated clockwise 90 degrees as limited by one of the corresponding detent 36 of cover 38. In one of these positions, device 10 is cut-out and the control valve side of device 10 is additionally vented to atmosphere by vent 18. To move device 10 to the second cut-out position, where the control valve is cut-out but not additionally vented to atmosphere, handle 28 may be rotated 90 degrees counter-clockwise from the open position to detent 34. Preferably, the second cutout position used for testing is clearly indicated using visible indicia on device 10 (or nearby) so that a carman does not inadvertently use the second cut-out position or a test operator does not forget to reset device 10 into the normal open position after testing procedures have concluded. Referring to FIG. 3, handle 28 could instead include a spring loaded pin 42 and pull ring 44 that must be withdrawn to allow handle 28 to be moved into the second cut-out position.

Figure 4:
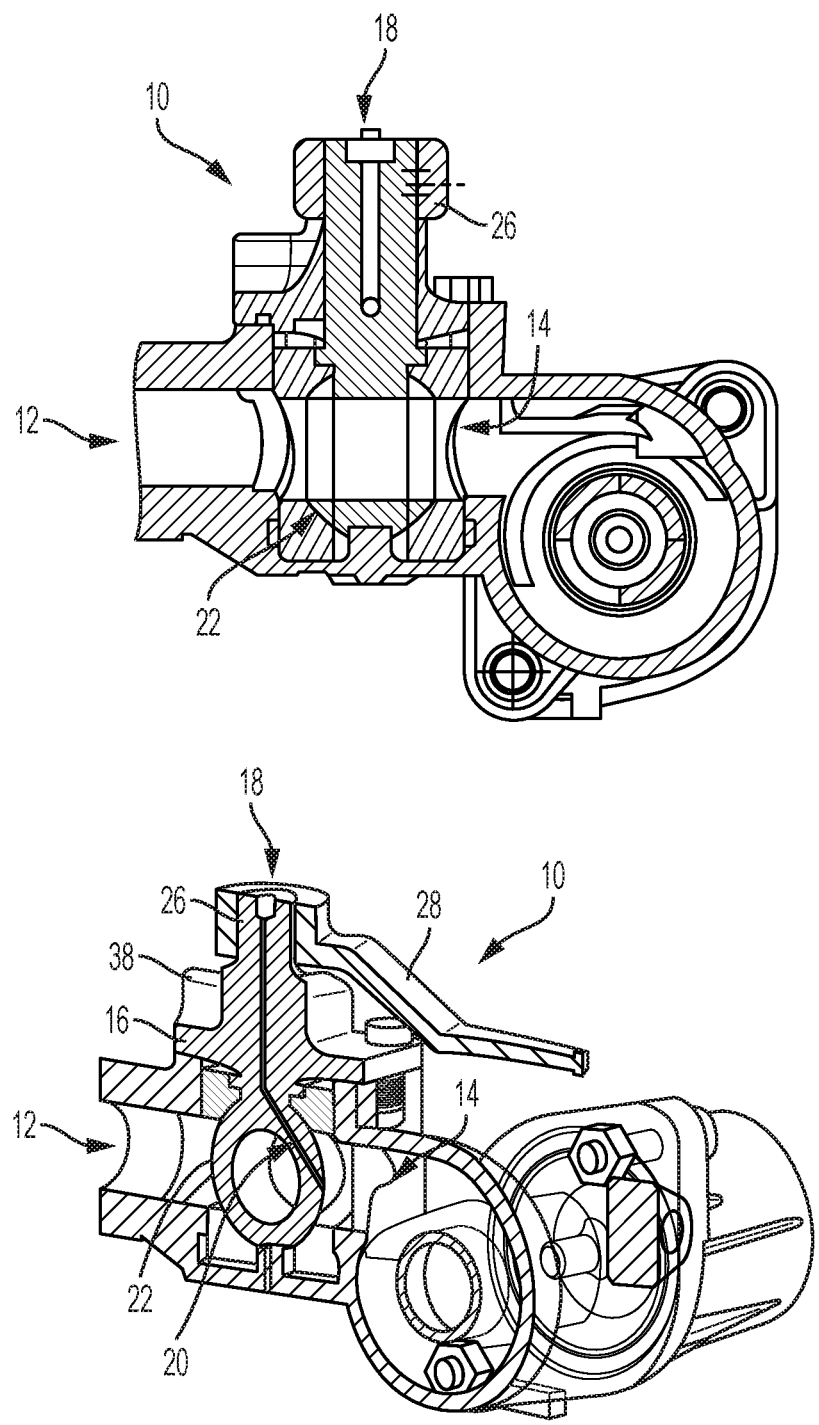
FIG. 4 is a schematic and cross-sectional view of another embodiment of a combined dirt collector and cutout cock according to the present invention.

Referring to FIG. 4, in an alternative embodiment, control valve vent 18 may be integrated into drive stem 26 of valve 16. In this configuration of device 10, air from the downstream side of device 10 is vented through vent passageway 20, which extends through a portion of ball 22 and then through drive stem 26 to vent 18 positioned at the free end of drive stem 26. Handle 28 of device 10 has at least three positions, normal, first cut-out position, and second cut-out position, with the control valve vent 18 only allowing venting when handle 28 is in the first cut-out position. This arrangement is advantageous as it allows for simple upgrading in the field by replacing the cover, the ball, and the drive stem and handle assembly of a conventional CDC & COC device with cover 38, ball 22, drive stem 26 and handle 28 according to the present invention.

Figure 5:
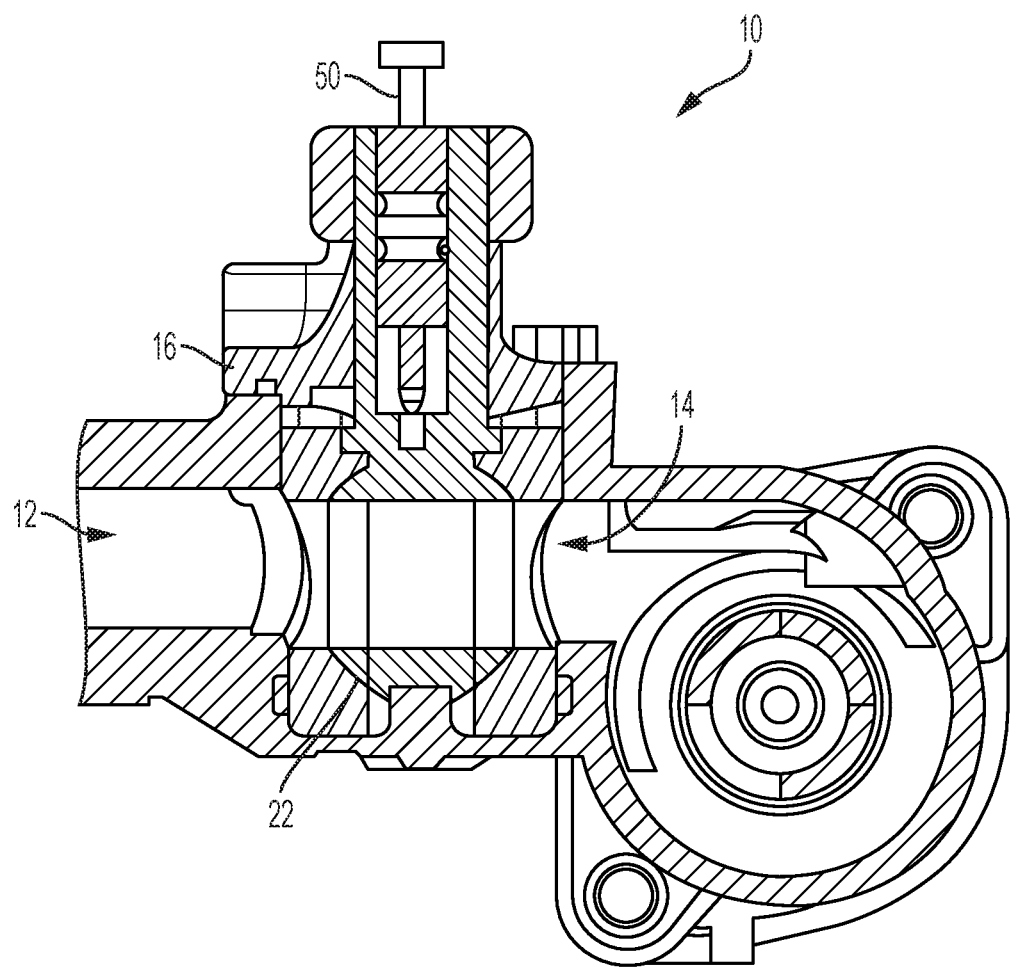
FIG. 5 is a cross-sectional view of a further embodiment of a combined dirt collector and cutout cock according to the present invention.

Referring to FIG. 5, another embodiment of device 10 comprises a two position valve 16 having an integral shut-off. This embodiment also includes vent 18 formed in drive stem 26 as described above in combination with an integral push/pull shut-off valve 50 that can be incorporated into an existing conventional CDC & COC device and only requires two handle positions. Push/pull shut-off valve 50 may be selectively operated to either open drive stem vent 18 for conventional cut-out operations or close drive stem vent 18 to allow for testing operations. Existing CDC & COC devices may thus be retrofit by replacing a conventional COC ball and drive stem with the drive stem 26, push/pull shut-off valve 50, and ball 22 of the present invention.

Figure 6:
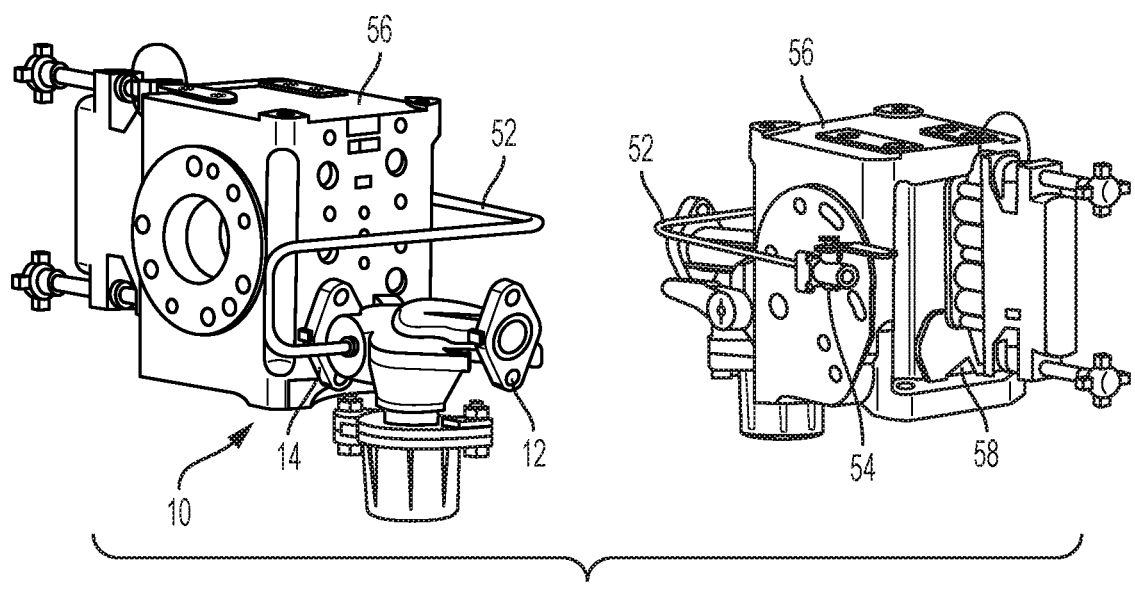
FIG. 6 is a schematic of an embodiment of a combined dirt collector and cutout cock in combination with a control valve pipe bracket according to the present invention.

Referring to FIG. 6, another embodiment of device 10 comprises a two position valve 16 having a control valve vent 18 which is always open when the device 10 is placed into the cut-out position and always closed when the device is placed into the open position, such as that seen in FIG. 1.

Rather than venting directly to atmosphere, however, control valve vent 18 is shunted away from device 10 via piping 52 to a remotely positioned shut-off valve 54. As seen in FIG. 6, shut-off valve 54 may be positioned on the opposing side of the pipe bracket 56 associated with the control valve and in close proximity to the testing interface 58 of the pipe bracket 56 (shown as an AAR type 4-port interface). Prior to the use of testing interface 58 for testing of the control valve, shut-off valve 54 can be closed to prevent vent 18 from venting pressurization that occurs during testing and then opened so that device 10 will again vent any unintended pressurization of the rail car braking system if a cut-out is desired.

Figure 7:
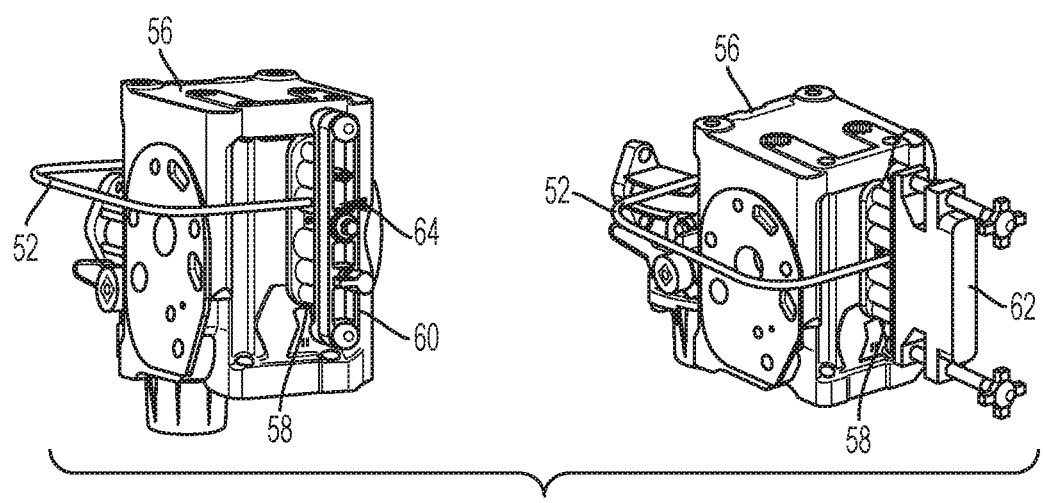
FIG. 7 is a schematic of another embodiment of a combined dirt collector and cutout cock in combination with a control valve pipe bracket according to the present invention.

Referring to FIG. 7, shut-off valve 54 may comprise a check valve installed in the cover 60 of the 4-port test interface 58 so that the check valve is held open when the 4 port cover is installed and allowed to close when the 4-port dust cover 60 is removed as it would be for any testing operations. As a result, with cover 60 installed, control valve vent 18 is always open and when cover 60 is removed by a test technician to attach testing equipment, control valve vent 18 will automatically close. At the conclusion of the testing operations, the cover is reinstalled which re-opens control valve vent 18. As a result, the opening and closing of control valve vent 18 does not require that the testing technician take any special steps with respect to device 10 and need not even know that the rail car have device 10. It should be recognized by those of skill in the art that check valve for control valve vent 18 could be similarly installed in the 4-port adaptor 58 itself and automatically open or close by 4-port dust cover 60 or even the attachment and removal of a 4-port test head 62 that is attached to and removed from the 4-port adaptor during testing operations. In another embodiment of device 10, piping 52 from control valve vent 18 may communicate with a vent hole 64 formed in the dust cover 60 of the 4-port adaptor 58. As 4-port test head 62 is connected to 4-port adaptor 58 after dust cover 60 is removed does not have any corresponding venting, vent hole 64 and thus control valve vent 18 will be effectively sealed off from atmosphere and testing operations could take place without a loss of pressurization through vent 18.

Figure 8:
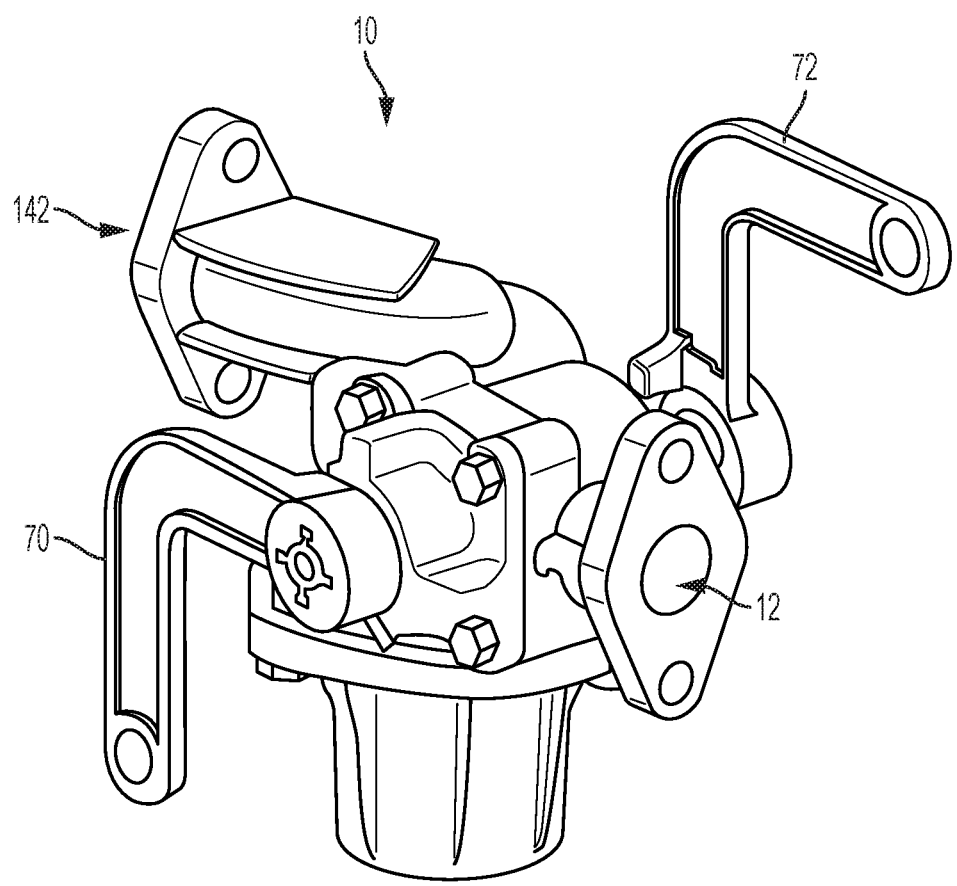
FIG. 8 is a perspective view of an embodiment of a combined dirt collector and cutout cock having two operating handles according to the present invention.

Referring to FIG. 8, another embodiment of device 10 includes two, two-position L-shaped handles 70 and 72 that can be more easily actuated via attached rods from the side of rail car than a three position handle would be from such a position. In this embodiment, one handle 70 controls the movement of device 10 between the open position and the closed position relative to venting through control valve vent 18. The other handle 72 controls movement of device 10 between the closed, vented position and the closed, non-vented position, i.e., by selectively opening and closing a shut-off valve 54 associated with control valve vent 18.

Figure 9:
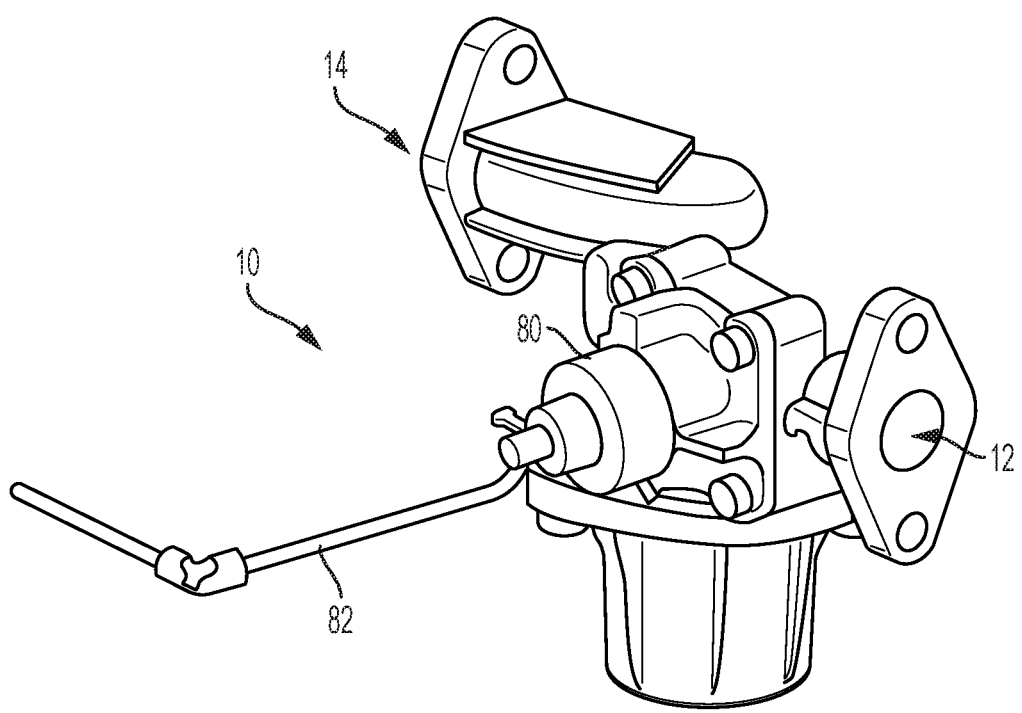
FIG. 9 is a perspective view of an embodiment of a combined dirt collector and cutout cock having a rotational operator according to the present invention.

Referring to FIG. 9, device 10 may include a rotating drive 80 in lieu of a handle 28 that is coupled to a rotatable driving linkage 82 that can be extended to the side of a rail car equipped with device 10. As a result, a user could remotely operate device 10 from the side of the rail car. In this embodiment, rotational detents 34 and 36 and any position indicators may be located at the side of rail and associated with whatever handle or actuator is used to drive linkage 82.

Figure 10:
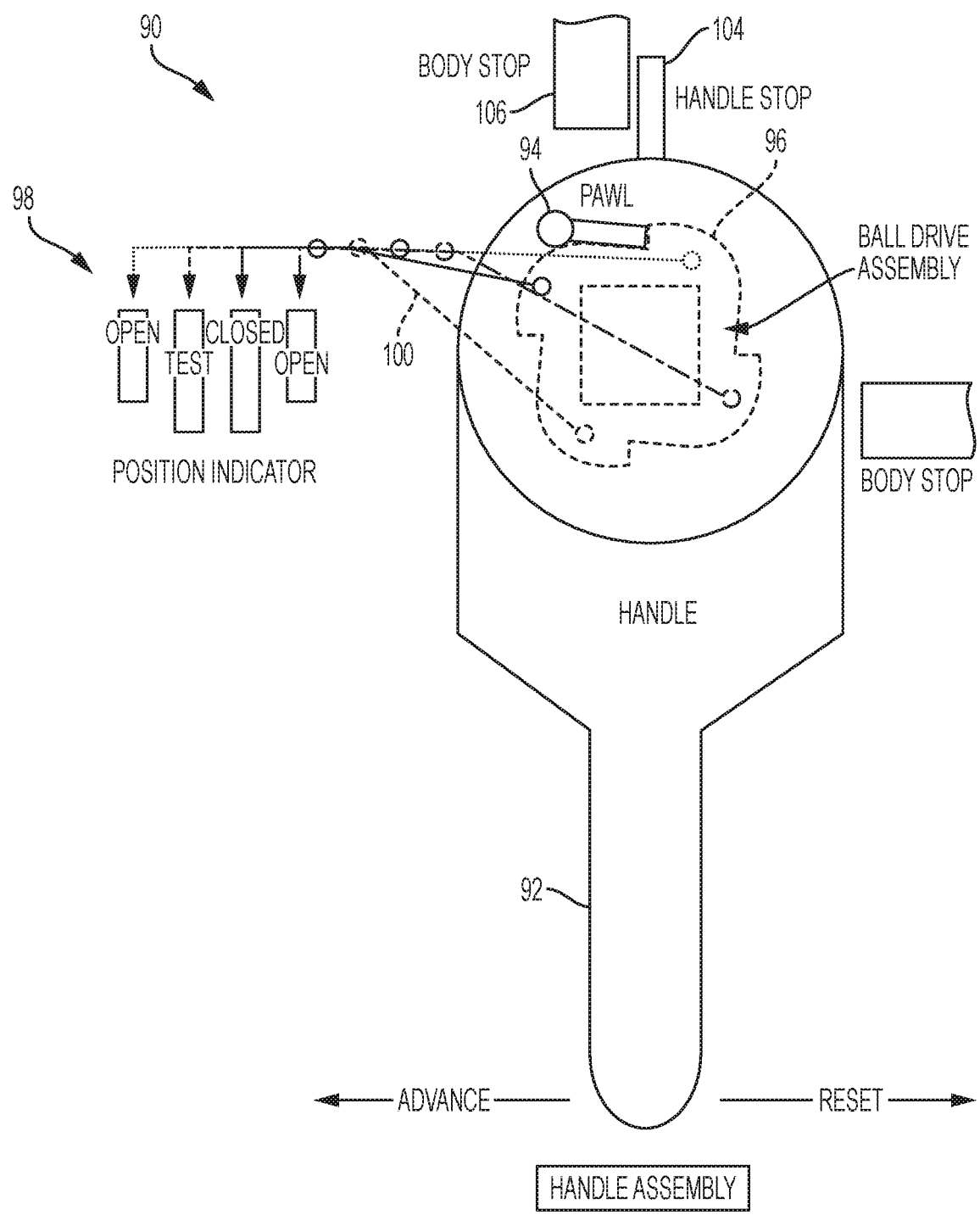
FIG. 10 is a cross-sectional view of a ratchet handle for an embodiment of a combined dirt collector and cutout cock and visual display according to the present invention

Referring to FIG. 10, device 10 using a three position system such as those described above could employ a one-way ratchet assembly 90 to switch device 10 between the various operating positions. Ratchet 90 allows ball 22 of device 10 to be positioned in each of four individual or sequential positions, i.e., open, closed (vented), open, and closed (test). Each time the handle 92 of ratchet assembly 90 is moved counter-clockwise from the vertical position to a horizontal position, ball 22 will advance to the next one of the positions. Ratchet assembly 90 includes a pawl 94 and a four position ratchet gear 96 that drives the position of ball 22 built into the head of handle 92 so that a conventional single-sided pipe bracket handle geometry may be used without the need for additional control handles or linkages. Handle 92 may be straight as shown in FIG. 9 or L-shaped handle as described above for operation via a rod that extends to the side of a rail car. It may be desirable to add an indicator 98 to device 10 that would give an operator a visual indication of the position of device 10. By connecting one end of an actuating rod or cable 100 to the outer radius of ratchet gear 96 and the opposite end to a sliding indicator 98, the position of device 10 could accurately displayed for an operator. Ratchet handle 92 preferably includes a handle stop 104 that interact with a stop 106 on device 10 for proper orientation of ball 22 into each of the four operating positions as ratchet assembly 90 is incremented sequentially through the four positions.

Figure 11:
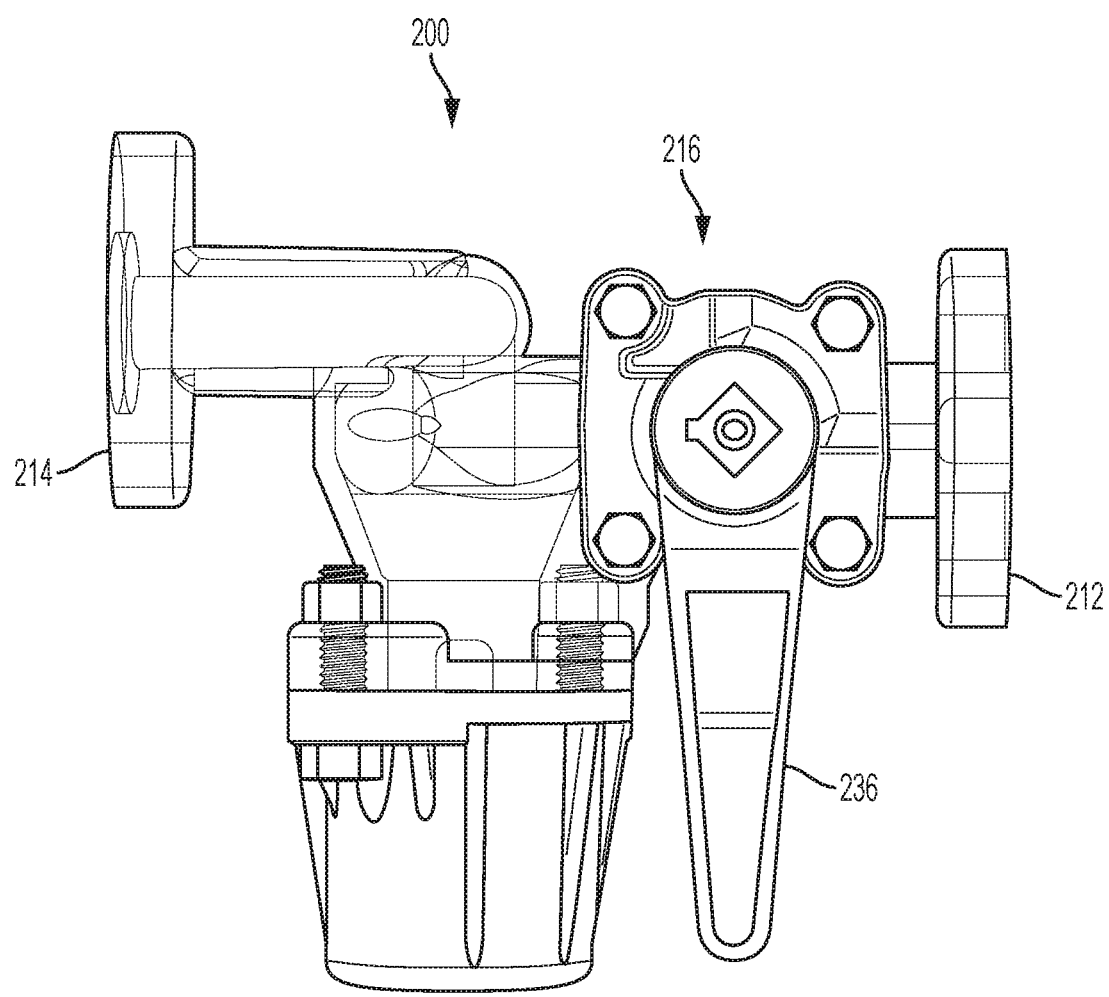
FIG. 11 is a side view of a further embodiment of a combined dirt collector and cutout cock according to the present invention.

Referring to FIG. 11, a further embodiment of a CDC & COC device 200 that prevents unintentional re-pressurization of a control valve and rail car braking system while allowing for routine testing of the associated control valve. Device 200 includes an inlet 212 that is connected to the air supply of the train (such as the brake pipe) and an outlet 214 that leads to the control valve of a rail car. A valve 216 positioned between inlet 212 and outlet 214 may be opened or closed to connect or disconnect the control valve that is attached to outlet 214 from the train air supply that is coupled to inlet 212.

Figure 12:
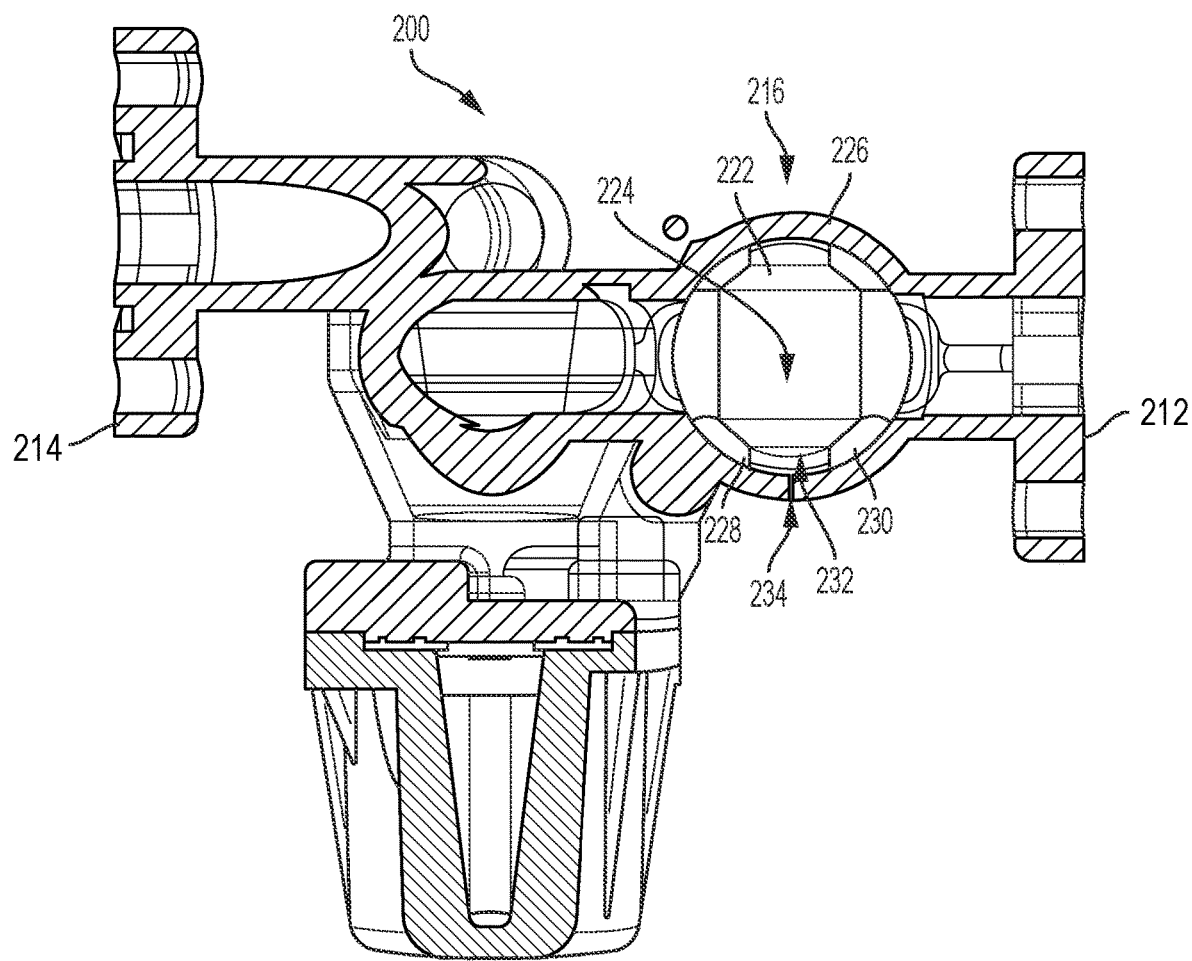
FIG. 12 is a cross-sectional view of the further embodiment of a combined dirt collector and cutout cock according to the present invention.
Figure 13:
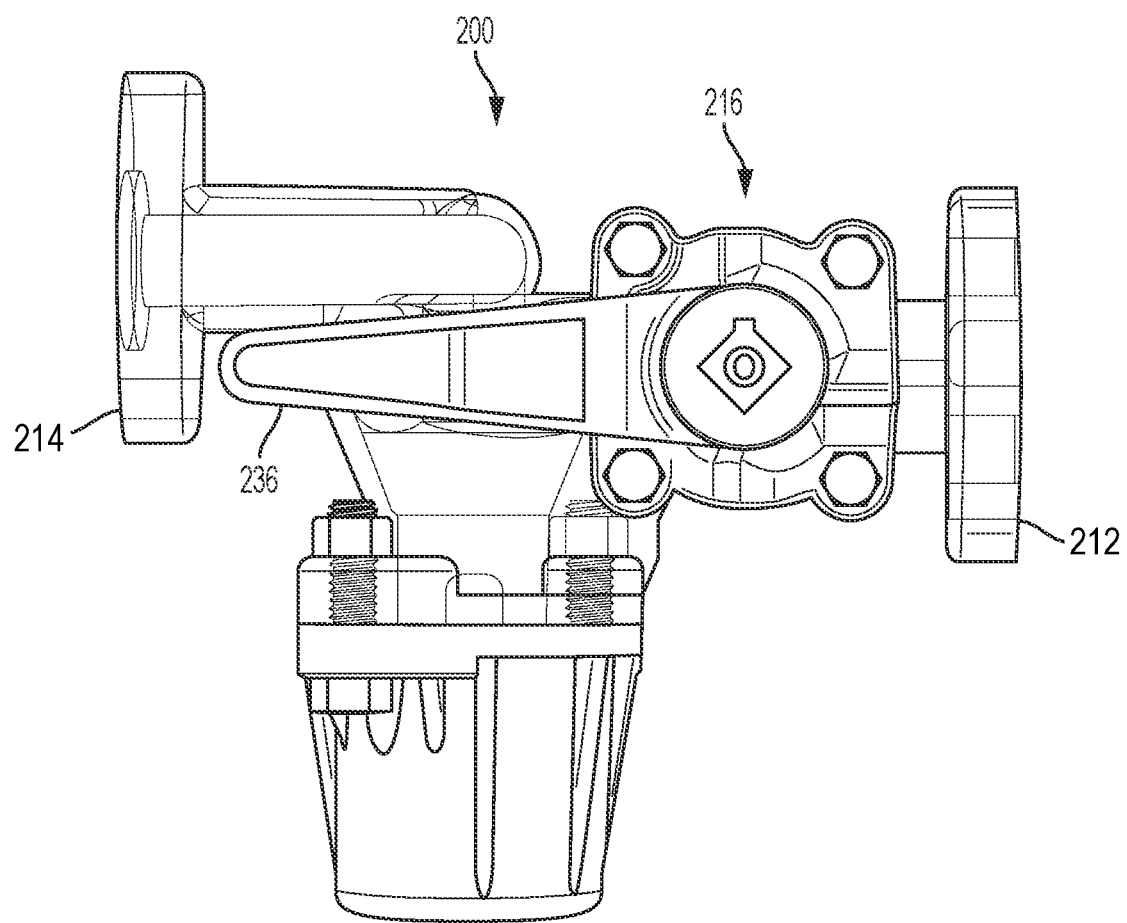
FIG. 13 is a side view of the further embodiment of a combined dirt collector and cutout cock according to the present invention.
Figure 14:
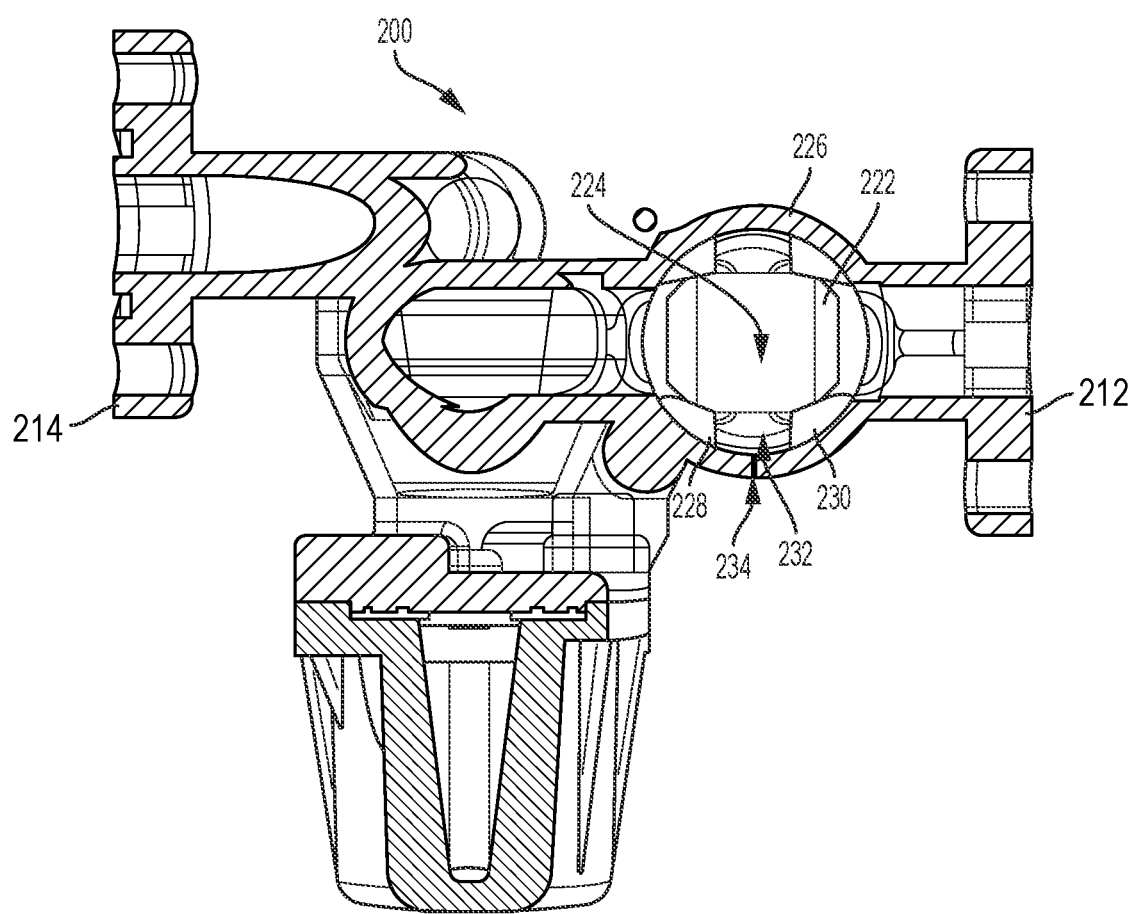
FIG. 14 is a cross-sectional view of the further embodiment of a combined dirt collector and cutout cock according to the present invention.
Figure 15:
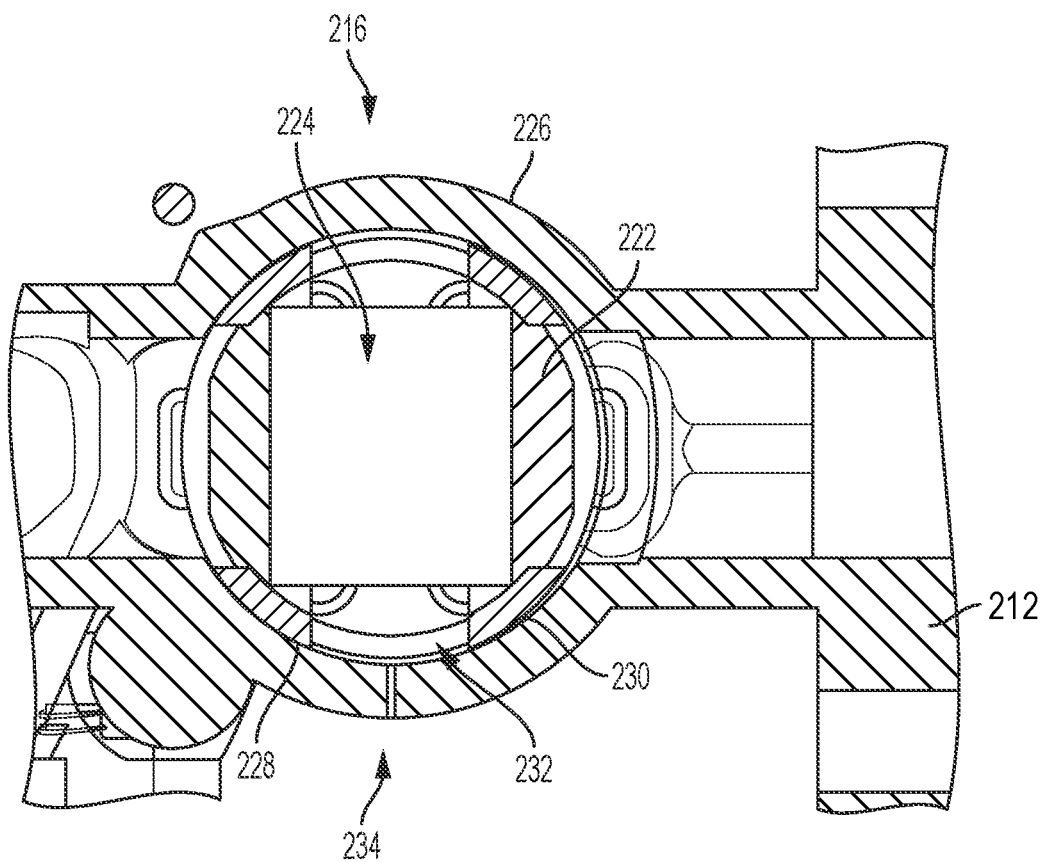
FIG. 15 is cross-sectional view of a valve for a further embodiment of combined dirt collector and cutout cock and visual display according to the present invention.

Referring to FIG. 12 through 14, valve 216 comprises a ball 222 having a passageway 224 formed therethrough. Ball 222 is positioned in a ball housing 226. A pair of opposing gaskets 228 and 230 extend partially around opposing sides of ball 222 to define a gap 232 therebetween that extends between ball 222 and the interior of ball housing 226. Gaskets 228 and 230 seal the outer surface of ball 222 and the interior surface of ball housing 226. Ball 222 is interconnected to a handle 236 that can rotate ball 222. A vent 234 extends through ball housing 226 in alignment with gap 232 between opposing gaskets 228 and 230. Ball 222 is moveable within ball housing 226 by handle 232 between a first position as seen in FIG. 12, where passageway 224 is aligned with and places inlet 212 and outlet 214 into fluid communication, and a second position as seen in FIG. 14, where passageway 224 is misaligned with and interrupts fluid communication between inlet 212 and outlet 214. As seen in FIG. 15, when ball 222 is in the second position, any pressure that leaks past opposing gaskets 228 and 230 will accumulate in gap 232 and be expelled via vent 234. Thus, when device 200 is placed into the cutout position so that valve 216 is the configuration seen in FIG. 15, inlet 212 and outlet 214 are isolated such that testing of the braking system may be performed. In the event that device 200 leaks, however, any control valve coupled to outlet 214 will not be unintentionally charged as is the case with a conventional cutout device. Instead, vent 216 will release any pressure that leaks around gaskets 228 and 230 by venting the pressure upstream of outlet 216, thereby preventing the pressure from unintentionally charging the control valve.

Figure 16:
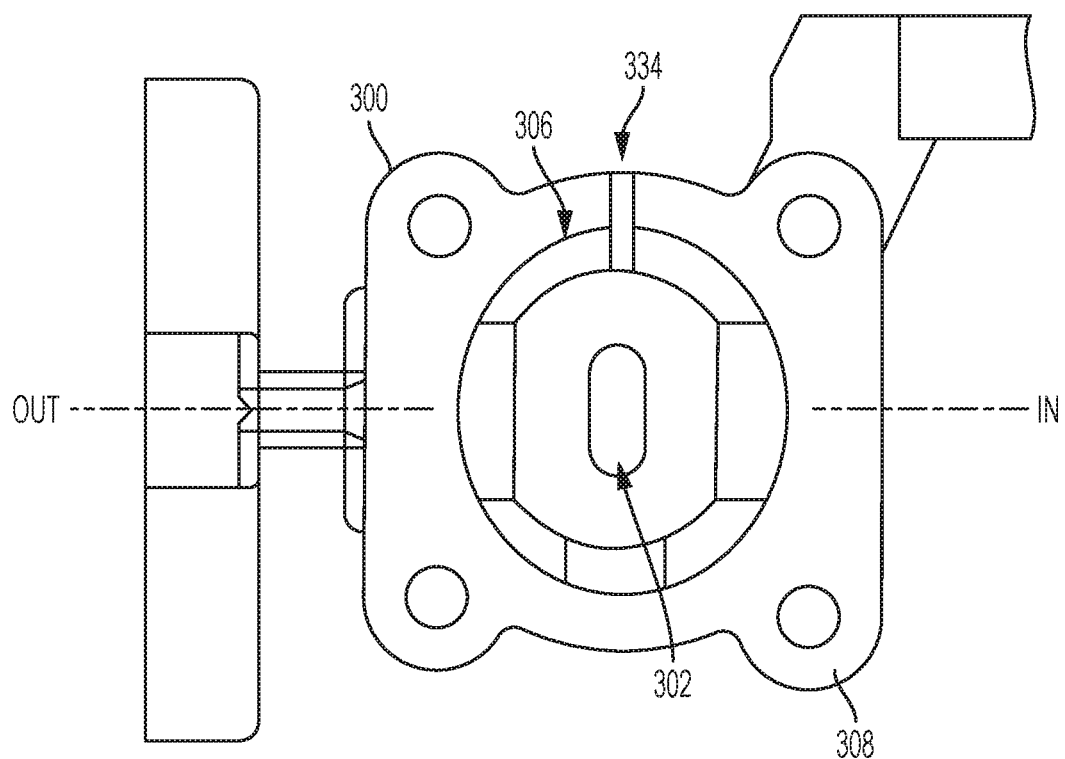
Figure 17:
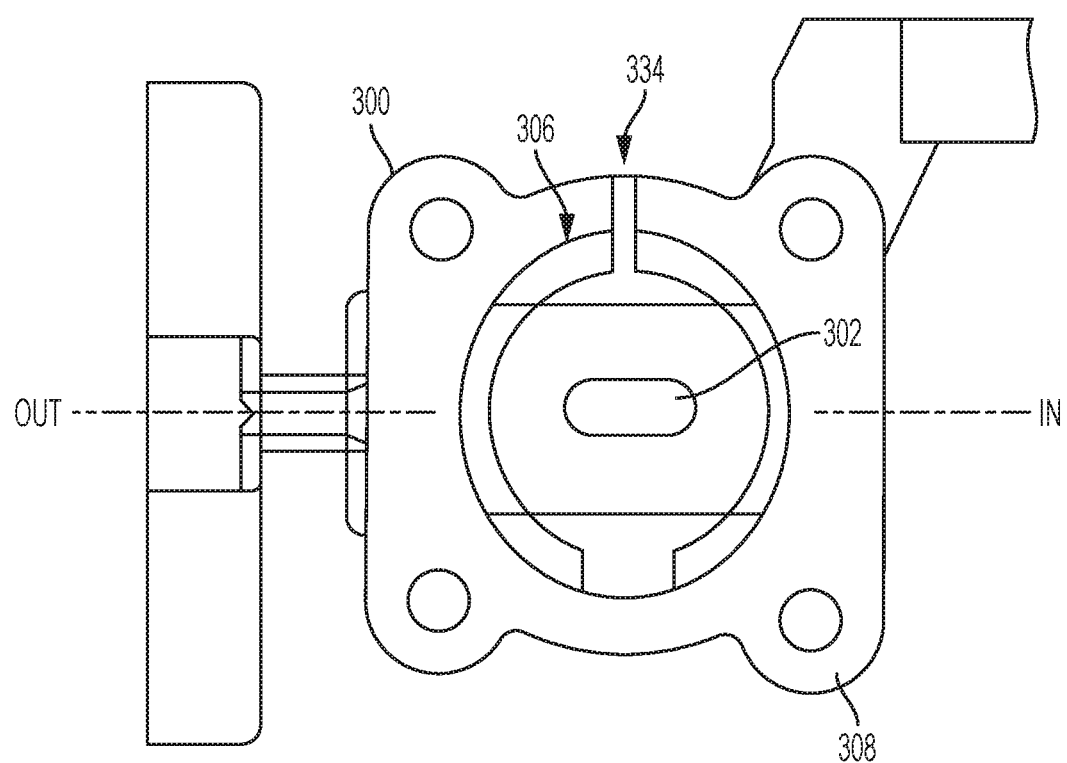

Referring to FIGS. 16 and 17, ball valves 300 that have a drive key 302 extending into or through the ball 304 should be configured to include a seal 306 that surrounds vent 334 according to the present invention so that seal 306 in valve body 308 cooperates with ball 304 to plug the vent 334 that is used to vent leaking pressure when ball 304 is in the open position so that pressure does not leak through the drive key 302 and then out of vent 334. As seen in FIG. 16, when ball valve 300 is in the open position, the outer surface of ball 304 extends across vent 334 to engage seal 306 that extends around vent 334. Vent 334 is thereby sealed when ball 304 is in the open position so that pressure will not leak from vent 334 even if drive key 302 would otherwise allow pressure to leak from valve 300.

What is claimed is:

1. A combined dirt collector and cutout cock device, comprising:
   an inlet configured for interconnection to an air supply;
   an outlet configured for interconnection to a control valve of a rail car;
   a valve moveable between a first position where the inlet is connected to the outlet and a second position where the inlet is isolated from the outlet;
   wherein the valve includes a vent positioned upstream of the outlet that is open when the valve is into the second position;
   wherein the valve includes a ball having a first passageway formed therethrough for selectively connecting and disconnecting the inlet from the outlet as the ball is rotated within the valve from the first position to the second position, and a second passageway formed therethrough that is positioned to interconnect the outlet with the vent when the valve is in the second position;
   wherein the valve further includes a valve cover having a pair of detents, wherein the valve cover is releasably coupled to the valve;
   a user handle interconnected to the valve and rotatable therewith between the first position, where the handle is contact with one of the pair of detents, and the second position, where the handle is in contact with the other of the pair of detents; and
   a locking element positioned to selectively block the user handle from rotating to the second position.

2. The device of claim 1, wherein the handle is interconnected to the ball via a drive stem that extends from a free end to an end that is coupled to the ball so that movement of the handle rotates the ball within the valve.

3. The device of claim 2, wherein the second passageway extends through the drive stem and the vent is positioned at the free end of the drive stem.

4. The device of claim 3, further comprising a shut-off valve that can selectively open and close the vent.

5. The device of claim 4, further comprising piping coupled to the vent.

6. The device of claim 5, wherein the piping is connected to the shut-off valve.

7. The device of claim 6, wherein the shut-off valve is positioned proximately to a 4-port test interface.

8. The device of claim 7, wherein the shut-off valve is incorporated into a dust cover of the 4-port test interface.

9. The device of claim 6, wherein the shut-off valve is incorporated into a 4-port test interface.

10. The device of claim 1, further comprising a shut-off valve associated with the vent, wherein the valve of the device and the shut-off valve are independently moveable via first and second handles, respectively.

11. The device of claim 1, further comprising a ratchet coupled to the user handle of the valve for movement of the valve between the first and second positions.

12. The device of claim 11, wherein the ratchet is configured to move the valve into at least a third position where the valve is closed and the vent is closed.

13. The device of claim 1, wherein the ball is positioned between a pair of opposing seals in a ball housing and the vent comprises an opening formed through the ball housing that is in alignment with a gap between the pair of opposing seals.

14. The device of claim 1, wherein the locking element is a locking handle positioned over the user handle.

15. The device of claim 1, wherein the locking element is a spring loaded pin.

* * * * *